(12) United States Patent
Raffler et al.

(10) Patent No.: US 10,710,717 B2
(45) Date of Patent: Jul. 14, 2020

(54) MULTIROTOR AIRCRAFT AND A METHOD FOR CONTROLLING THE MULTIROTOR AIRCRAFT

(71) Applicant: AUTEL ROBOTICS CO., LTD., Shenzhen, Guangdong (CN)

(72) Inventors: Thomas Raffler, Guangdong (CN); Jian Wang, Guangdong (CN)

(73) Assignee: AUTEL ROBOTICS CO., LTD., Shenzhen (CN)

( * ) Notice: Subject to any disclaimer, the term of this patent is extended or adjusted under 35 U.S.C. 154(b) by 46 days.

(21) Appl. No.: 16/050,515

(22) Filed: Jul. 31, 2018

(65) Prior Publication Data

US 2018/0354622 A1 Dec. 13, 2018

Related U.S. Application Data

(63) Continuation of application No. PCT/CN2016/073058, filed on Feb. 1, 2016.

(51) Int. Cl.
*B64C 39/02* (2006.01)
*B64D 47/08* (2006.01)
(Continued)

(52) U.S. Cl.
CPC ............ *B64C 39/024* (2013.01); *B64D 47/08* (2013.01); *G05D 1/0038* (2013.01);
(Continued)

(58) Field of Classification Search
CPC .... B64C 39/024; B64D 47/08; G05D 1/0038; G05D 1/0094; G05D 1/0808
See application file for complete search history.

(56) References Cited

U.S. PATENT DOCUMENTS 3,231,221 A * 1/1966 Platt .................... B64C 29/0033
   244/12.4
3,259,343 A * 7/1966 Roppel ............... B64C 29/0091
   244/53 R
(Continued)

FOREIGN PATENT DOCUMENTS

CN   103640690 A   3/2014
CN   204290620 U   4/2015
(Continued)

OTHER PUBLICATIONS

Extended European Search Report dated Dec. 7, 2018; Appln. No. 16888622.4.

*Primary Examiner* — Justin M Benedik

(57) ABSTRACT

A multirotor aircraft and a method for controlling the multirotor aircraft are disclosed. The multirotor aircraft comprises a body and a H-shaped frame, wherein, the body is mounted with a bearing, a first person view camera and a servo mechanism, the end of each arm of the H-shaped frame far away from a lateral shaft thereof is mounted with an actuator assembly, the lateral shaft of the H-shaped frame is connected with the body by the bearing, and the servo mechanism is coupled with the lateral shaft of the H-shaped frame and is configured to control the rotation of the lateral shaft of the H-shaped frame, in order to control the angle between the body and the H-shaped frame. The method comprises a first mode and a second mode, wherein in the first mode, keeping the horizon within the camera view of the aircraft; and in the second mode, generating control command on the basis of the camera aligned axis.

20 Claims, 3 Drawing Sheets

(51) Int. Cl.
     *G05D 1/00*      (2006.01)
     *G05D 1/08*      (2006.01)
(52) U.S. Cl.
     CPC ......... *G05D 1/0094* (2013.01); *G05D 1/0808* (2013.01); *B64C 2201/024* (2013.01); *B64C 2201/027* (2013.01); *B64C 2201/108* (2013.01); *B64C 2201/127* (2013.01); *B64C 2201/146* (2013.01)

(56) References Cited

U.S. PATENT DOCUMENTS

| | | | | |
|---|---|---|---|---|
| 4,678,141 | A * | 7/1987 | Sarrantonio | B64C 37/02 244/2 |
| 2011/0001001 | A1* | 1/2011 | Bryant | B64C 29/0033 244/12.5 |
| 2015/0021429 | A1* | 1/2015 | Reichert | B64C 27/04 244/17.23 |

FOREIGN PATENT DOCUMENTS

| | | |
|---|---|---|
| CN | 104890864 A | 9/2015 |
| CN | 204701770 U | 10/2015 |
| CN | 105207408 A | 12/2015 |
| CN | 105235912 A | 1/2016 |
| DE | 102008025607 A1 | 12/2009 |
| KR | 20120081500 A | 7/2012 |
| WO | 2015/099375 A1 | 7/2015 |

* cited by examiner

MULTIROTOR AIRCRAFT AND A METHOD FOR CONTROLLING THE MULTIROTOR AIRCRAFT

TECHNICAL FIELD OF THE INVENTION

The present invention relates generally to unmanned aerial vehicle, and in particular to a multirotor aircraft and a method for controlling the multirotor aircraft.

BACKGROUND OF THE INVENTION

Multirotor aircraft designed for first person view (FPV) piloting, usually employs an upturned fixed-angle camera as a compromise between forward and hover flight. It aims to the ground in fast forward-flight and to the sky in horizontal hover flight. In addition, the high pitch angle in forward flight leads to increased aerodynamic drag of the multirotor body.

SUMMARY OF THE INVENTION

A multirotor aircraft and a method for controlling the multirotor aircraft are provided, to obtain a more speed-independent and balanced camera view in terms of ground/sky and to reduce the aerodynamic drag in forward flight at the same time.

According to the first aspect of the present invention, a multirotor aircraft is provided. The multirotor aircraft comprises: a body and a H-shaped frame, wherein, the body is mounted with a bearing, a first person view camera and a servo mechanism, the end of each arm of the H-shaped frame far away from a lateral shaft thereof is mounted with an actuator assembly, the lateral shaft of the H-shaped frame is connected with the body by the bearing, and the servo mechanism is coupled with the lateral shaft of the H-shaped frame and is configured to control the rotation of the lateral shaft of the H-shaped frame, in order to control the angle between the body and the H-shaped frame.

Preferably, the servo mechanism comprises an actuator, a gear and a rotary position sensor, the actuator is coupled with the lateral shaft of the H-shaped frame by the gear and the rotary position sensor is configured to sense the rotation of the actuator.

Preferably, the shaft of the actuator is mounted with a first gear, the lateral shaft of the H-shaped frame is mounted with a second gear, and the first gear is coupled with the second gear.

Preferably, the two arms connected with each side of the lateral shaft are manufactured as one piece.

Preferably, each arm of the H-shaped frame is fixedly or removably coupled with the lateral shaft of the H-shaped frame.

Preferably, the bearing comprises a sliding bearing or a rolling bearing.

Preferably, the actuator assembly comprises an actuator and a propeller coupled with the actuator.

Preferably, the actuator comprises electric motor, mechanical actuator, hydraulic actuator or pneumatic actuator.

According to a second aspect of the present invention, a method for controlling the multirotor aircraft of the first aspect of the present invention is provided. The method comprises a first mode and a second mode, wherein, in the first mode, keeping the horizon within the camera view of the aircraft; and in the second mode, generating a control command on the basis of the camera aligned axis.

Preferably, keeping the horizon within the camera view of the aircraft comprises: keeping horizon in the camera view of the multirotor aircraft by controlling the angle between the body and H-shaped frame thereof utilizing the servo mechanism thereof.

Preferably, generating a control command on the basis of the camera aligned axis comprising:
obtaining the angle between the camera and the body of the aircraft as well as the attitude of the aircraft;
determining the camera aligned axis according to the obtained angle and attitude; and
generating a control command based on the determined camera aligned axis.

Preferably, obtaining the attitude of the aircraft comprises:
obtaining the aerodynamic velocity vector of the aircraft and the angle between the body and H-shaped frame of the aircraft; and
obtaining the attitude of the aircraft on the basis of the aerodynamic velocity vector and the angle between the body and the H-shaped frame.

Preferably, the control command comprises a rate command.

Preferably, the method further comprising,
in the second mode, controlling the servo mechanism to keep the angle between the body and the H-shaped frame of the multirotor aircraft fixed during the hover flight to cruise flight transition.

Preferably, the method further comprising,
in the second mode, receiving an angle adjustment command, and according to the angle adjustment command, controlling the servo mechanism to adjust the angle between the body and the H-shaped frame of the multirotor aircraft.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known method, procedures, components and circuits have not been described in detail so as not to obscure the present invention.

Multirotor aircrafts accelerate and fly forward by tilting their propeller plane to the desired direction. In case of first person view (FPV) piloting, a fixed-angle camera therefore aims to the ground in fast forward-flight with negative pitch angles and more to the sky in horizontal hover flight. In addition, the high pitch angle leads to increased aerodynamic drag of the multirotor body.

To face this problem, there are currently two types of solutions. The first approach creates a constant offset angle between the propeller plane and the camera axis in order to find a compromise between hover flight and forward flight. In its most simple and widespread form this is achieved by an upturned, fixed-angle camera mount. The second approach (Tilt Racing Drone, OFM SWIFT TR260) employs servo-controlled tilting motor aims in order to adjust the camera-propeller angle dynamically. The front and back motor arm of the H shaped frame is rotated synchronously in order to tilt the rotor plane without tilting the multirotor's body.

The first approach (fixed camera-propeller angle) has the disadvantage of only partial compensation of pitch angle in forward flight and over compensation in hover flight which makes take-off and landing harder due to limited sight. Additionally, the body is in general not properly aligned with the flight direction, thus producing additional drag. For high camera tilt-angles, it becomes obvious and non-intuitive, that the pilot's rate commands are not aligned with the camera frame, but stay in the body-fixed frame.

The second approach has drawbacks in two aspects. First, the overall system performance degrades at high tilt angles due to the propeller downwash hitting the rear propellers and due to the reduced lever arm between the motor axes. Besides that, there is no intuitive transition from hover flight to cruise flight due to attitude control and a lack of visual feedback to the pilot.

The multirotor aircraft and the method for controlling an aircraft provided by the present disclosure aim to obtain a more speed-independent and balanced camera view in terms of ground/sky and to reduce the aerodynamic drag in forward flight at the same time.

As used herein, the terms 'upper', 'lower', 'vertical', 'horizontal' and other similar position-indicating terms are used with reference to the multirotor aircraft in its normal operation mode, and should not be considered limiting.

Figure 1:
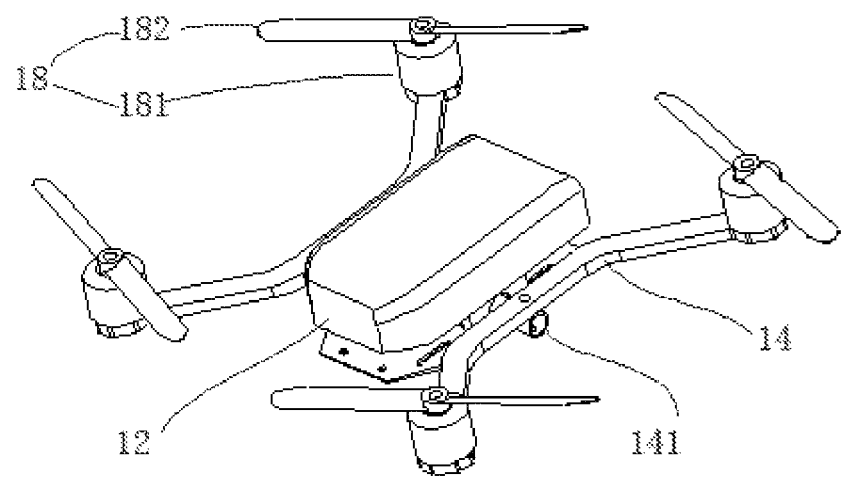
FIG. 1 illustrates an isometric view of a multirotor aircraft in accordance with an embodiment of the present invention.
Figure 2:
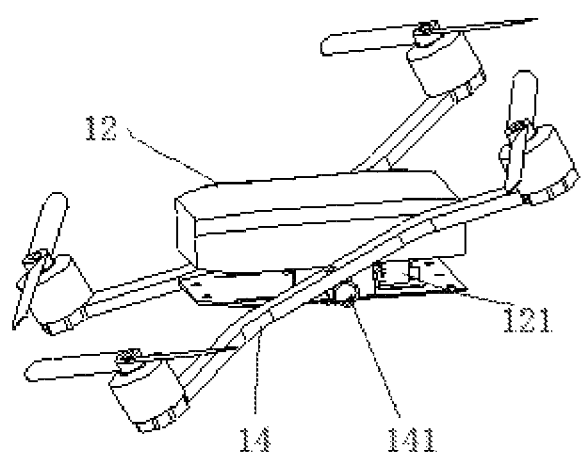
FIG. 2 illustrates another isometric view of the multirotor aircraft of FIG. 1, in accordance with an embodiment of the present invention.

FIG. 1 illustrates an isometric view of a multirotor aircraft in accordance with an embodiment of the present invention. As illustrated in FIG. 1, the multirotor aircraft 10 may comprises a body 12 and a frame 14. The frame 14 may have a lateral shaft 141, and the body 12 and the lateral shaft 141 of the frame 14 may be connected by a bearing, so that the frame 14 can rotate around the lateral shaft 141 with regard to the body 12. As shown in FIG. 2, the frame 14 has rotated a certain angle around the lateral shaft 141 with regard to the body 12. A servo mechanism 121 may be mounted on the body 12, for controlling the rotation of the lateral shaft 141, so as to control the angle between the body 12 and the frame 14.

In various embodiments, an actuator assembly 18 may be positioned on each arm of the H-shaped frame 14. The actuator assembly 18 may comprise an actuator 181 and a propeller 182 coupled to the actuator 181. The actuator 181 may comprise electric motor, mechanical actuator, hydraulic actuator, pneumatic actuator, or the like. Electric motors may include magnetic, electrostatic or piezoelectric motors.

For example, in an embodiment, the actuator includes a brushless DC electric motor. The actuator assembly 18 may be fixedly or removably coupled to each arm of the H-shaped frame 14.

The body 12 may be mounted with one or more electrical component adapted to control various aspects of the operation of the multirotor aircraft 10. As used herein, the term 'electrical component' refers to any component that provides, uses or transmits electricity. Such electrical components can include an energy source (e.g., battery), flight control or navigation module, GPS module (e.g., GPS receiver or transceivers), inertial measurement unit (IMU) module, communication module (e.g., wireless transceiver), electronic speed control (ESC) module adapted to control an actuator (e.g., electric motor), actuator(s) such as an electric motor used to actuate a propeller of the multirotor aircraft, electrical wirings and connectors, and the like. In some embodiments, some of the electrical components may be located on an integrated electrical unit such as a circuit board or module. In some embodiments, some of the electrical components may be located on one or more circuit modules. Each circuit module can include one or more electrical components. For example, the circuit module can include the flight control module that includes one or more processors (such as implemented by a field-programmable gate array (FPGA)) for controlling key operation of the multirotor aircraft. As another example, the same or a different circuit module can also include an IMU module for measuring the velocity, orientation and gravitational forces of the multirotor aircraft. The IMU module can include one or more accelerometers and/or gyroscopes. As another example, the same or a different circuit module can also include a communication module for remotely communicating with a remote control device. For example, the communication module can include a wireless (e.g., radio) transceiver. The communication module can be provided with button or buttons and corresponding indicator light that is spaced apart from the buttons. The buttons and the indicator light may be used for facilitating communication between the multirotor aircraft and a remote control device. For example, the buttons may be used to adjust the frequency channel used by the multirotor aircraft and the indicator light can be used to indicate the success and/or failure of the establishment of a communication channel between the multirotor aircraft and the remote control device.

The fight control module is typically a key component or 'brain' of a multirotor aircraft. For example, the flight control module can be configured to estimate the current velocity, orientation and/or position of the multirotor aircraft based on data obtained from visual sensors (e.g., cameras), IMU, GPS receiver and/or other sensors, perform path planning, provide control signals to actuators to implement navigational control and the like. As another example, the flight control module can be configured to issue control signals to adjust the state of the multirotor aircraft based on remotely received control signals.

As illustrated in FIG. 1, the body 12 has a rectangular shape, and the head of the body may be curved to facilitate high speed flight. In other examples, the shape of the body 12 may be different from that of FIG. 1, for example, cone, cylinder etc. The body 12 may be mounted with a first person view camera, for first person view piloting. In an example, the first person view camera may be positioned in the head of the body.

Figure 3:
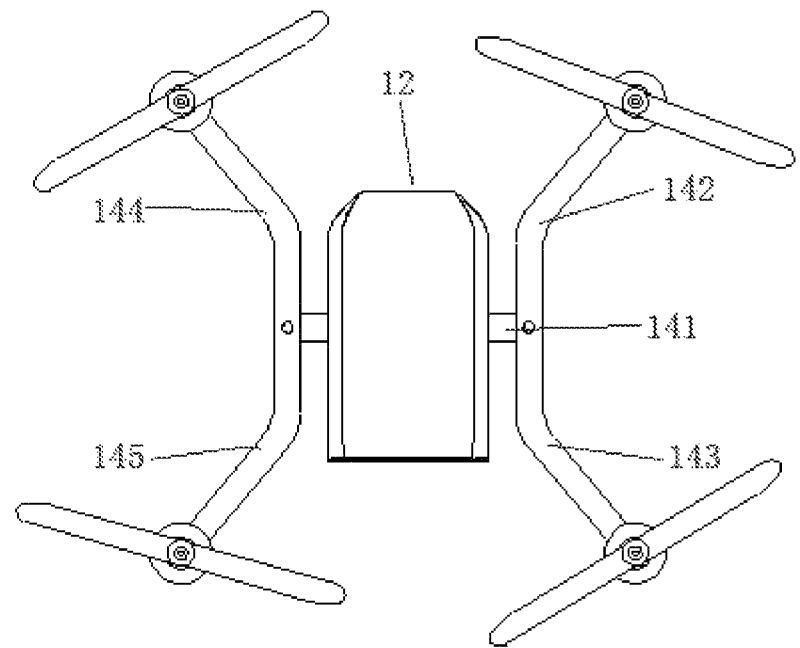
FIG. 3 illustrates a top view of the multirotor aircraft of FIG. 1, in accordance with an embodiment of the present invention.

FIG. 3 illustrated a top view of the multirotor aircraft of the FIG. 1, in accordance with an embodiment of the present invention. As illustrated in FIG. 3, the frame 14 may comprise four arms 142-145 and a lateral shaft 141, wherein two arms 142, 143 may be connected to one end of the lateral shaft 141, and the other two arms 144, 145 may be connected to the other end of the lateral shaft 141, and the four arms may be within the same plane. The two anus connected to either end of the lateral shaft may be symmetric with each other. The two arms 142, 143 connected to one end of the lateral shaft and the other two arms 144, 145 connected to the other end of the lateral shaft may be symmetric with respect to the central vertical line of the lateral shaft 141. As illustrated in FIG. 3, the four arms 142-145 and lateral shaft 141 of the frame may form a H-shaped frame. As used herein, the term 'H-shaped frame' does no necessarily means strict H-shaped frame, but can also mean similar H-shaped frame as illustrated in FIG. 3.

In some embodiments, the four arms 142-145 of the H-shaped frame 14 may be bended away from the body 12, so as to avoid the collision of the propellers on different arms in the case of a short lateral shaft. In other embodiments, the four aims of the H-shaped frame 14 may have a shape different from the shape as shown in FIG. 3. For example, the four arms may be straight, or may be bended toward the body, or may be any other shapes.

In some embodiment, each arm of the H-shaped frame 14 may be removably coupled to the lateral shaft 141. For example, during assembly of the H-shaped frame, each arm may be removably coupled to the lateral shaft via fasteners such as screw, bolt, buckle, clamp, clasp, latch, hook, nail, pin, strap, cable, or the like. Such removable coupling can be used to facilitate maintenance of the multirotor aircraft. When maintenance is required, each arm may be decoupled from the lateral shaft. In another embodiment, each arm and the lateral shaft of the H-shaped frame may be welded or otherwise permanently held together.

In various embodiments, any individual or combination of the components that form the H-shaped frame 14 can be manufactured using any suitable technique such injection molding, additive manufacturing (3-D printing) techniques, or the like. For example, each arm 142-145 and the lateral shaft 141 of the H-shaped frame 14 can be manufactured individually and welded, fastened or otherwise combined to form the H-shaped frame. As another example, the two arms 142-143 connected to one end of the lateral shaft can be integrally manufactured as one piece, and the other two arms 144-145 connected to the other end of the lateral shaft can be integrally manufactured as one piece. Then the two integrally manufactured pieces and the lateral shaft 141 can be combined (via welding, fastener, etc.) to form the H-shaped frame 14. As yet another example, the H-shaped frame 14 can be integrally manufactured, for example, using injection molding or additive manufacturing techniques.

Figure 4:
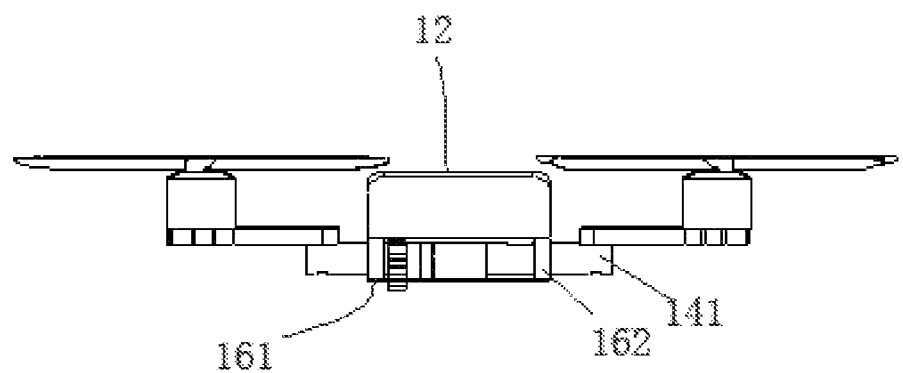
FIG. 4 illustrates a back view of the multirotor aircraft of FIG. 1, in accordance with an embodiment of the present invention.

FIG. 4 illustrated a back view of the multirotor aircraft of FIG. 1, in accordance with an embodiment of the present invention. In some embodiment, the lateral shaft 141 can be connected with the body 12 by a bearing. For example, as illustrated in FIG. 4, two bearings 161-162 may be positioned underneath the body 12, and the lateral shaft 141 of the H-shaped frame 14 may go through the two bearings 161-162, so that the H-shaped frame 14 may rotate around the lateral shaft 141 with respect to the body 12. In other examples, the two bearings 161-162 may be positioned at other places of the body, for example, may be positioned on the top of the body, or may be positioned on both sides of the body. The bearing can comprise a sliding bearing or a rolling bearing.

Figure 5:
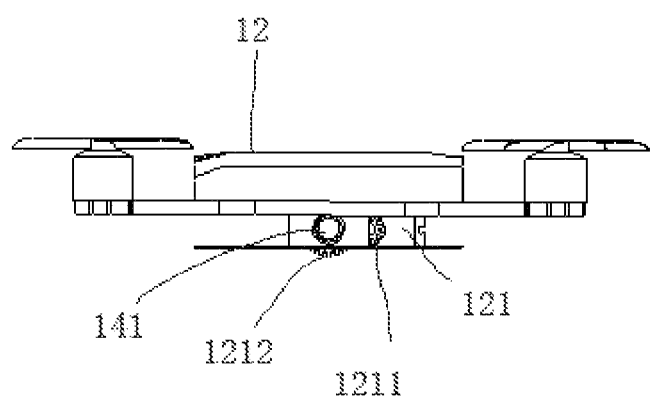
FIG. 5 illustrates a side view of the multirotor aircraft of FIG. 1, in accordance with an embodiment of the present invention.

FIG. 5 illustrates a side view of the multirotor aircraft of FIG. 1, in accordance with an embodiment of the present invention. As illustrated, the body 12 may be mounted with a servo mechanism 121. The servo mechanism 121 may comprise an actuator, a gear and a rotary position sensor. The actuator may be coupled to the lateral shaft of the H-shaped frame by the gearing, so as to drive the lateral shaft of the H-shaped frame to rotate. For example, as illustrated in FIG. 5, one gear 1211 may be positioned on the shaft of the actuator, and another gear 1212 may be positioned on the lateral shaft 141 of the H-shaped frame, these two gears may be coupled with each other, so that the actuator may drive the gear on its shaft, which drives the gear on the lateral shaft, and as a result drives the lateral shaft to rotate. The two gears may be coupled to the shaft of the actuator and the lateral shaft of the H-shaped frame respectively by a spline or a flat key. As another example, one gear may be connected to the shaft of the actuator by a spline or a flat key, the lateral shaft may be manufactured as a gear shaft, and the gear may be coupled with the gear shaft, so that the actuator can drive the gear shaft to rotate. In various embodiments, rotary position sensor may sense the rotation of the actuator, and determine the angle between the boy and the H-shaped frame on the basis of the quantity of the rotation. As discussed above, the actuator may comprise electric motor, mechanical actuator, hydraulic actuator, pneumatic actuator, or the like. Electric motors may include magnetic, electrostatic or piezoelectric motors.

The multirotor aircraft provided by embodiments of the present invention can solve the aforementioned problems. The camera view and the aerodynamic drag of the main body are optimized by aligning the body including the camera with the direction of flight. This is achieved by a two-piece construction with a dynamically controlled angle between the body and the frame with actuators and propellers. This way, the body can be operated at its lowest coefficient of drag without introducing interference between the front and rear propellers. Due to the fixed relative actuator angles and positions, the propellers still breathe laminar air and are not affected by the downwash of the front propellers.

According to an embodiment of the present invention, a method for controlling an aircraft is provided. The method may comprise a beginner friendly mode and an advanced mode. In the beginner friendly mode, horizon is kept in the camera view of the aircraft. In the advanced mode, a control command is generated on the basis of the aircraft's camera aligned axis. The beginner friendly mode makes the FPV not only fun but also easy to fly. The advanced mode makes the user have an intuitive visual feedback of his/her commands.

In various embodiments, the generation of a control command on the basis of the aircraft's camera aligned axis may be implemented by the following procedures: obtaining the angle between the camera and the body as well as the attitude of the aircraft; determining the camera aligned axis according to the obtained angle and attitude; and generating a control command based on the determined camera aligned axis. The control command may comprise rate command.

In some embodiments, the aircraft may have a fixed body, tilting camera configuration. For example, the aircraft may be the aforementioned multirotor aircraft with an upturned fixed-angle camera.

In the case of a multirotor aircraft with an upturned fixed-angle camera, the method may comprise: in the beginner friendly mode, keeping horizon within the camera view of the aircraft, by controlling each rotor's rotating speed.

As an example, the above procedure may be implemented by the following steps: obtaining images taken by the camera; determining whether horizon is approaching an edge of the camera view according to the obtained images; if so, determining the direction in which horizon is approaching the edge; adjusting each rotor's rotating speed according to the reverse direction of the determined direction, in order to avoid horizon from leaving the camera view. For example, when it is determined that horizon is approaching the lower edge of the camera view according to the images taken by the camera, implying that the aircraft is flying upward with a high pitch angle, each rotor's rotating speed need to be controlled in order to reduce the pitch angle of the aircraft, so that horizon will not go across the lower edge of the camera. When it is determined that horizon is approaching the upper edge of the camera view, implying that the aircraft is flying downward with a negative pitch angle, each rotor's speed need to be controlled in order to increase the pitch angle, so that horizon will not go across the upper edge of the camera view.

As another example, the above procedure may be implemented by the following steps: obtaining the biggest pitch angle and the smallest pitch angle which make horizon within the camera view, according to the angle between the camera and the body as well as camera's view angle; obtaining the current pitch angle of the aircraft; if the current pitch angle of the aircraft is bigger than the biggest pitch angle, then controlling the speed of each rotor of the aircraft in order to reduce the pitch angle of the aircraft; if the current pitch angle of the aircraft is smaller than the smallest pitch angle, then controlling the speed of each rotor of the aircraft in order to increase the pitch angle of the aircraft. For example, camera's view angle may be 60 degree, and the angle between the camera and the body is 10 degree, so the biggest pitch angle is 20 degree, and the smallest pitch angle is −40 degree. If the current pitch angle of the aircraft is bigger than 20 degree, then the speed of each rotor of the aircraft need to be controlled in order to reduce the pitch angle of the aircraft, however, if the current pitch angle is smaller than −40 degree, then the speed of each rotor of the aircraft need to be controlled in order to increase the pitch angle of the aircraft.

In some embodiments, the aircraft may be the multirotor aircraft according to embodiments of the present invention. The additional degree of freedom provided by the tilting mechanism may be used to control the multirotor aircraft.

In beginner friendly mode, horizon may be kept within the camera view by controlling the angle between the body and the H-shaped frame of the multirotor aircraft utilizing the servo mechanism. For example, when forward flight is desired, a normal multirotor aircraft speeds up the back rotors and slows down the front rotors, so that the body is tilted forward and the forward force is generated. However, as to the multirotor aircraft in accordance with embodiments of the present invention, the angle between the body and the H-shaped frame may be made larger by the servo mechanism, so that the rotors on the H-shaped frame may tilt forward and thus generate forward force. Therefore, forward flight can be realized while the alignment of the body and the flight direction is maintained, and as a result, horizon is kept within the camera view.

In the advanced mode, the step of obtaining the attitude of the aircraft may be implemented by the following steps: obtaining the aerodynamic velocity vector of the aircraft and the angle between the body and H-shaped frame of the aircraft; and obtaining the attitude of the aircraft on the basis of the aerodynamic velocity vector and the angle between the body and the H-shaped frame. The angle between the body and the H-shaped frame may be obtained by the rotary position sensor of the servo mechanism of the multirotor aircraft.

In some embodiments, the method may further comprise: in the advanced mode, controlling the servo mechanism to keep the angle between the body and the H-shaped of the multirotor aircraft unchanged during the hover to cruise flight transition. Specifically, in the advanced mode, the actuator of the servo mechanism is kept still to keep the angle between the body and the H-shaped frame unchanged during the hover to cruise flight transition. Thus, intuitive visual feedback of the attitude may be provided to the user.

In some embodiments, the method may further comprise: in the advanced mode, receiving angle adjustment command from the user, and adjusting the angle between the body and the H-shaped frame of the multirotor by controlling the servo mechanism. In this way, the automatic angle compensation can be individually adjusted by the user.

In view of the above, the multirotor aircraft in accordance with embodiments of the present invention may be used as FPV race multirotor for high speed flight with improved aerodynamic efficiency in cruise flight. The additional degree of freedom provided by the tilting mechanism gives a more intuitive camera view to the user.

Further, the multirotor aircraft can also be used as normal camera drone with 360 degree camera view utilizing the tilting degree of freedom of the camera.

While preferred embodiments of the present invention have been shown and described herein, it will be obvious to those skilled in the art that such embodiments are provided by way of example only. Numerous variations, changes, and substitutions will now occur to those skilled in the art without departing from the spirit of the present invention. It should be understood that various alternatives to the embodiments of the invention described herein may be employed in practicing the invention. It is intended that the following claims define the scope of the invention and that methods and structures within the scope of these claims and their equivalents are covered hereby.

The invention claimed is:

1. A multirotor aircraft, comprising:
a body and a H-shaped frame, wherein, the body is mounted with a bearing, a first person view camera and a servo mechanism, a end of each arm of the H-shaped frame far away from a lateral shaft thereof is mounted with an actuator assembly, the lateral shaft of the H-shaped frame is connected with the body by the bearing, and the servo mechanism is coupled with the lateral shaft of the H-shaped frame and is configured to control the rotation of the lateral shaft of the H-shaped frame, in order to control the angle between the body and the H-shaped frame: wherein each arm of the H-shaped frame is bent outward.

2. The multirotor aircraft of claim 1, wherein,
the servo mechanism comprises an actuator, a gear and a rotary position sensor, the actuator is coupled with the lateral shaft of the H-shaped frame by the gear and the rotary position sensor is configured to sense the rotation of the actuator.

3. The multirotor aircraft of claim 2, wherein,
the shaft of the actuator is mounted with a first gear, the lateral shaft of the H-shaped frame is mounted with a second gear, and the first gear is coupled with the second gear.

4. The multirotor aircraft of claim 1, wherein,
the two arms connected with each side of the lateral shaft are manufactured as one piece.

5. The multirotor aircraft of claim 1, wherein,
each arm of the H-shaped frame is fixedly or removably coupled with the lateral shaft of the H-shaped frame.

6. The multirotor aircraft of claim 1, wherein,
the bearing comprises a sliding bearing or a rolling bearing.

7. The multirotor aircraft of claim 1, wherein,
the actuator assembly comprises an actuator and an propeller coupled with the actuator.

8. The multirotor aircraft of claim 1, wherein,
the actuator comprises electric motor, mechanical actuator, hydraulic actuator or pneumatic actuator.

9. A method for controlling the multirotor aircraft of claim 1, comprising, a first mode and a second mode, wherein,
in the first mode, keeping the horizon within the camera view of the aircraft; and in the second mode, generating a control command on the basis of the camera aligned axis.

10. The method of claim 9, wherein, keeping the horizon within the camera view of the aircraft comprises:
keeping horizon in the camera view of the multirotor aircraft by controlling the angle between the body and H-shaped frame thereof utilizing the servo mechanism thereof.

11. The method of claim 9, wherein, generating a control command on the basis of the camera aligned axis comprising:
obtaining the angle between the camera and the body of the aircraft as well as the attitude of the aircraft;
determining the camera aligned axis according to the obtained angle and attitude; and
generating a control command based on the determined camera aligned axis.

12. The method of claim 11, wherein, obtaining the attitude of the aircraft comprises:
obtaining the aerodynamic velocity vector of the aircraft and the angle between the body and H-shaped frame of the aircraft; and
obtaining the attitude of the aircraft on the basis of the aerodynamic velocity vector and the angle between the body and the H-shaped frame.

13. The method of claim 9, wherein, the control command comprises a rate command.

14. The method of claim 9, wherein, the method further comprising,
in the second mode, controlling the servo mechanism to keep the angle between the body and the H-shaped frame of the multirotor aircraft fixed during the hover flight to cruise flight transition.

15. The method of claim 9, wherein, the method further comprising,
in the second mode, receiving an angle adjustment command, and according to the angle adjustment command, controlling the servo mechanism to adjust the angle between the body and the H-shaped frame of the multirotor aircraft.

16. The multirotor aircraft of claim 4, wherein,
each arm of the H-shaped frame is fixedly or removably coupled with the lateral shaft of the H-shaped frame.

17. The multirotor aircraft of claim 2, wherein,
the actuator comprises electric motor, mechanical actuator, hydraulic actuator or pneumatic actuator.

18. The multirotor aircraft of claim 3, wherein,
the actuator comprises electric motor, mechanical actuator, hydraulic actuator or pneumatic actuator.

19. The multirotor aircraft of claim 7, wherein,
the actuator comprises electric motor, mechanical actuator, hydraulic actuator or pneumatic actuator.

20. A method for controlling the multirotor aircraft of claim 2, comprising, a first mode and a second mode, wherein,
in the first mode, keeping the horizon within the camera view of the aircraft; and in the second mode, generating a control command on the basis of the camera aligned axis.

* * * * *